United States Patent [19]
Boehmer et al.

[11] Patent Number: 5,165,950
[45] Date of Patent: Nov. 24, 1992

[54] MICROWAVE EXPANDABLE HALF PRODUCT AND PROCESS FOR ITS MANUFACTURE

[75] Inventors: Edward W. Boehmer, Bloomington; William L. Bennet, Plymouth; Terry J. Guanella, Bricelyn; Leon Levine, Plymouth, all of Minn.

[73] Assignee: American Amaranth, Inc., Bricelyn, Minn.

[21] Appl. No.: 750,927

[22] Filed: Aug. 28, 1991

[51] Int. Cl.$^5$ .......................... A23L 1/025; A23L 1/18
[52] U.S. Cl. ..................... 426/559; 426/242; 426/446; 426/448; 426/449; 426/560; 426/625
[58] Field of Search ............ 426/559, 360, 446, 448, 426/449, 625, 242

[56] References Cited

U.S. PATENT DOCUMENTS

| | | | |
|---|---|---|---|
| 3,753,735 | 8/1973 | Gerkens | 426/441 |
| 3,966,990 | 6/1976 | Cremer et al. | 426/550 |
| 4,131,689 | 12/1978 | Wilke | 426/242 |
| 4,179,525 | 12/1979 | Kleinschmidt | 426/19 |
| 4,251,551 | 2/1981 | Van Hulle et al. | 426/94 |
| 4,409,250 | 10/1983 | Van Hulle et al. | 426/446 |
| 4,526,800 | 7/1985 | Howard | 426/448 |
| 4,608,261 | 8/1986 | MacKenzie | 426/446 |
| 4,844,937 | 7/1989 | Wilkinson et al. | 426/559 |
| 4,873,110 | 10/1989 | Short et al. | 426/621 |
| 4,911,943 | 3/1990 | Slimak | 426/552 |
| 4,931,303 | 6/1990 | Holm et al. | 426/549 |
| 4,938,982 | 7/1990 | Howard | 426/448 |
| 4,950,492 | 8/1990 | Shachat et al. | 426/446 |
| 4,990,348 | 2/1991 | Spratt et al. | 426/446 |
| 4,994,295 | 2/1991 | Holm et al. | 426/446 |

Primary Examiner—Jeanette Hunter
Assistant Examiner—Mary S. Mims
Attorney, Agent, or Firm—Haugen and Nikolai

[57] ABSTRACT

A process is disclosed for preparing a shelf stable half product expandable in microwave ovens. A chlorinated soft wheat flour, corn starch, modified corn starch and whole grain amaranth flour are combined to form a dry starch mixture. Salt and flavoring additives (if desired) are combined with the dry starch mixture. These ingredients are thoroughly mixed in a ribbon blender, then preconditioned in a paddle mixer with injection of steam and water, to form a mixture with moisture at 22-24 percent by weight. This mixture is provided to a twin screw extruder where it is worked and heated to substantially gelatinize the starches, vented for rapid cooling and moisture release, conveyed and lightly worked at reduced temperature, then forced through a shaping die and cut into pieces of the desired shape. The pieces are dried in a drying enclosure, at an air temperature of 43 degrees C., for about three and one-half to four hours.

23 Claims, 1 Drawing Sheet

MICROWAVE EXPANDABLE HALF PRODUCT AND PROCESS FOR ITS MANUFACTURE

BACKGROUND OF THE INVENTION

The present invention relates to foods formed of extruded half products of cereal grains such as wheat and corn, and more particularly to half products suitable for expansion or puffing in microwave ovens.

Foods suitable for expanding (i.e. puffing or popping) have been made from extruded flours of cereal grains such as corn, wheat and oats. Other expandable foods include popping corn and amaranth grain. Traditionally, such products have been puffed by deep-fat frying. In recent years, concern about the greasy texture and calorie content of foods prepared by frying in fats or oils, has lead to increasing use of alternatives to deep-fat frying. Among these alternatives is the microwave oven. The widespread household use of microwave ovens has inspired efforts to provide half products and other foods suitable for microwave expansion.

For example, Van Hulle et al U.S. Pat. No. 4,409,250 discloses sugar coated, microwave puffable snacks. Pellets are formed from gelatinized farinaceous doughs, formed from waxy maize, millet, sorghum, milo and rice starches, as well as potato or tapioca starch. Optionally, sucrose and common salt can be added to the dough, to enhance expanding or puffing when the pellets are subject to microwave energy. The pellets are formed by extrusion under pressure and heat, then dried. Before they can be puffed, the pellets much be placed in a puffing medium of water and a carbohydrate sweetening agent.

Wilkinson et al U.S. Pat. No. 4,844,937 discloses a puffable half product made from corn materials, principally corn reduction flour or dry milled horny endosperm flour obtained by tempering whole corn, then running the tempered kernels through a degerminator. The material is combined with moisture, then run through an extruder to gelatinize the starch. A resulting dough is delivered to rotary blender, where the dough pieces are agitated to reduce surface moisture. The pieces then are delivered to a forming extruder where they are shaped, then cut and dried.

Spratt et al U.S. Pat. No. 4,990,348 is directed to half products expanded either by microwave or convection energy. The half products are based on a variety of raw materials including wheat starch, corn meal, potato flour, wheat flour and substantially brand-free oat flour. The material is tempered, heated, then extruded to form an unexpanded starch melt that hardens into a densified, glass-like half product. The product intentionally is cooled rather than dried, causing it to harden without substantially lowering its moisture content, which is said to provide a shelf stable ready to expand half product.

While the above and many other processes have proven satisfactory in connection with certain foods, these approaches do not adequately address the need for a cereal grain half product that undergoes substantial and reliable expansion in consumer microwave ovens.

Therefore, it is an object of the present invention to provide a process for preparing food half products employing moisture levels, temperatures and pressures lower than heretofore considered necessary.

Another object is to provide a half product based predominantly on starch sources other than corn, and at least in part utilizing amaranth flour.

Yet another object of the invention is to provide a food half product expandable in microwave ovens to an expanded volume substantially greater than the unexpanded volume.

SUMMARY OF THE INVENTION

To achieve these and other objects, there is provided a process for preparing a shelf stable food half product expandable when exposed to microwave energy. The process includes the following steps:

forming a dry starch mixture including at least 46 percent by weight a chlorinated soft wheat flour, from about 15 percent to about 25 percent by weight corn starch, from about 6 percent to about 15 percent by weight modified corn starch, and adding salt to the dry starch mixture in an amount ranging from about 5 percent to about 10 percent of the mixture, by weight;

heating the starch mixture and salt to a temperature of about 100 degrees C. while adding moisture until the mixture includes from about 22 percent to about 27 percent moisture, by weight;

kneading the mixture while maintaining the temperature of the starch mixture in the range of from about 100 degrees C. to about 110 degrees C.;

after said kneading, venting the starch mixture to rapidly cool the mixture to a temperature substantially below 100 degrees C.;

after said venting step, further lightly working the starch mixture while maintaining the temperature of the mixture below 100 degrees C.;

forming the mixture into a predetermined shape and cutting the mixture into pieces having the predetermined shape; and drying the pieces to reduce their moisture content to within the range of about 9 percent to about 14 percent by weight, at a rate sufficiently gradual to substantially prevent case hardening.

Preferably the dry starch mixture is formed by thoroughly mixing the ingredients in a ribbon blender. Then, the starch mixture including salt and other additives is preconditioned in a paddle mixer, while steam and water are injected into the paddle mixture to increase the moisture of the starch mixture to within the desired range.

The preferred apparatus for the kneading, venting and working steps is a twin screw extruder having nine heads or zones. The initial five zones are heated to maintain the mixer temperature above 100 degrees C., the material of the starch mixture is mechanically worked, and water is added if necessary, all of which result in a substantially complete gelatinization of the starch in the mixture. The sixth zone of the extruder provides an open venting stage, along which steam escapes from the mixture to cause rapid cooling. In the final stage of the extruder (the seventh through the ninth zones), the starch mixture, by this time a gelatinized dough mass, is conveyed through the extruder with relatively minor mechanical work upon the dough. The dough is shaped by forcing it through a die at the downstream end of the extruder.

Beyond the die, the dough mass is cut into individual pieces and dried, preferably at a temperature in the range of 43 degrees C. to 65 degrees C., for about three and one-half to four hours. This reduces the moisture content of the pieces to 9-14 percent, more preferably to 10-12 percent, by weight, while avoiding case hardening of the pieces. Further, it is preferable to wait at least a few days after drying, prior to microwave puffing. It is believed that immediately after drying, there remains a moisture gradient in each piece of the half product, i.e. due to a higher moisture content at the center of each piece. The moisture gradient is substantially reduced after a few days, without substantially changing the total moisture content of each piece.

The process of the invention is advantageously employed to produce a shelf stable food half product expandable in microwave ovens. The product is a substantially rigid, uniform matrix of substantially completely gelatinized starch from a dry starch mixture including at least 46 percent by weight a chlorinated soft wheat flour, from about 15 percent to 25 percent by weight corn starch, from about 6 percent to about 15 percent by weight modified corn starch, and additives including salt at from about 5 percent to about 10 percent by weight. The matrix is expandable in a microwave oven to an expanded volume of at least five times the unexpanded volume of the matrix.

The starch mixture further can include whole grain amaranth flour in the range of from 5 percent to 15 percent of the mixture, by weight. More particularly, the starch mixture includes the soft wheat flour at 61 percent, corn starch at 18-22 percent and more preferably 21 percent, modified corn starch at 1-10 percent and more preferably 9 percent, and amaranth flour at 8-10 percent and more preferably 9 percent. Additives to this basic mixture include the salt in the range of 3.2 percent to 5 percent, and flavoring additives in the range of 1 percent to 10 percent of the base mixture.

The food half product, prepared in accordance with the invention, has exhibited surprisingly favorable expansion when exposed to microwave energy in consumer microwave ovens. More particularly, the expansion yields a volume typically at least seven times the volume of the original, unexpanded half product. Frequently this amount of expansion is exceeded, to the point where occasional yields include expanded volumes exceeding thirteen times the original volume. The precise reason for this degree of expansion is not yet known. Corn starch and modified corn starch are known to enhance expansion, as is the addition of salt. The predominance of chlorinated soft wheat flour is thought to enhance gelatinization by promoting hydration and gelatinization of the starches. The amaranth flour is high in amylopectin, which is believed to promote puffing, yet also high in protein, which is believed to diminish puffability. However, the surprising expansion of the half product of the present invention, when subjected to microwave energy, is believed to be a synergistic result of the unique combination of ingredients, leading to a snack food having a fine texture, a crispness upon the initial bite, yet with a tenderness and rapid mouth melt.

IN THE DRAWINGS

FIG. 1 is a schematic view of a process for manufacturing a food half product according to the present invention; and FIG. 2 is a schematic view showing part of a twin screw extruder employed in the process.

DETAILED DESCRIPTION OF THE PREFERRED EMBODIMENT

Figure 1:
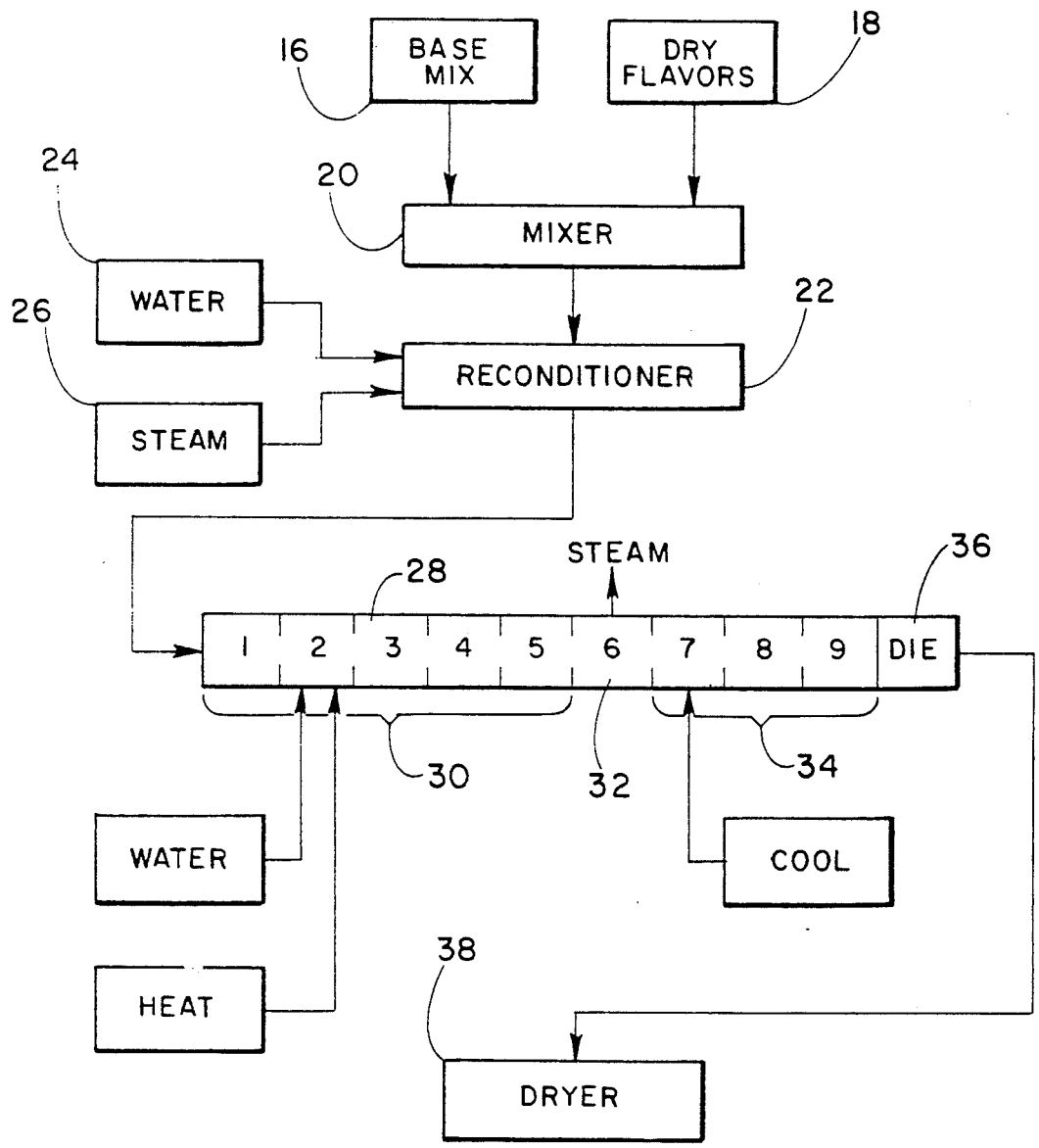

Preparation of food half products according to the present invention involves selection of appropriate materials to provide a dry starch mix, identified as a base mix 16 in FIG. 1. A chlorinated soft wheat flour, known in the industry as cake flour, is preferred as the predominant source of starch, due to its low to moderate cost, and its relatively high nutritional content (e.g. as compared to corn, the wheat being substantially higher in calcium, iron and phosphorous, and somewhat higher lysine). Also, however, the cake flour is somewhat lower in protein than other wheat flours, which is believed to promote rapid hydration and cooking (gelatinization) of the starch.

Another desirable starch source is amaranth flour. Amaranth is considered nutritional, due to its relatively high content of protein, lysine, calcium and iron, for example as compared to corn and wheat. The minute (1-3 micrometer) starch particles of amaranth flour are believed to provide particularly favorable reception of flavoring additives. The contribution of amaranth to product puffability is probably close to neutral. The high amylopectin content is thought to enhance expansion, while the high protein level is thought to hinder expansion.

Corn starch and modified corn starch are favored starch sources, in that they are known to enhance puffing, are relatively low cost and abundant, and have nutritional value. These starches are particularly favorable in combination with amaranth flour, as amino acids lacking in corn are abundant in amaranth. Modified corn starch enhances the dry starch mixture in that it is more resistant to over cooking, enhances thickness and stability of the doughs formed from starch mixes, and provides resistance to heat and shear during cooking.

The starch mixture is further enhanced with dry additives as indicated at 18, for example salt and dry flavoring additives. Salt is considered particularly advantageous in the present invention, as the presence of salt leads to ion concentrations that absorb microwave energy, to enhance microwave expansion or puffing of the product. Common salt (NaCl) is preferred, although other edible salts can be employed, for example CaCl and KCl.

The base mix and additives are combined in a mixing device 20, e.g. a ribbon blender, a rotary blender, a rotating drum or a paddle mixer (for more rapid mixing, if desired). The product is agitated in the mixing device for a period of time (typically from one to five minutes) sufficient to thoroughly mix the constituents and provide a substantially uniform, dry mass.

The output of mixer 20 is provided to a preconditioning device 22, which can be a paddle mixer or an auger conveyor. Water and steam are injected into the preconditioning device as indicated at 24 and 26, respectively, at controlled rates to initiate cooking of the starch mixture and increase the moisture content of the starch mixture and additives to a moisture percent, by weight, in the range of about 22-27 percent, and more preferably 24-25 percent. For a throughput rate of about 110 kilograms per hour, water is added at about 6.4 kilograms per hour, and steam is injected at a rate of about 15 kilograms per hour. As the mixture including the base and additives leaves preconditioning device 22, it is in the form of a damp powder, having a consistency of, for example, moist sand.

From preconditioning device 22, the mixture is provided to an extruder 28, preferably a twin screw extruder. Extruder 28 includes nine zones cooperating to provide three stages of treatment for the dough. An initial heating and moisturizing stage 30, a rapid cooling or venting stage 32, and a subsequent conveyance stage 34, just upstream of a forming die 36.

Figure 2:
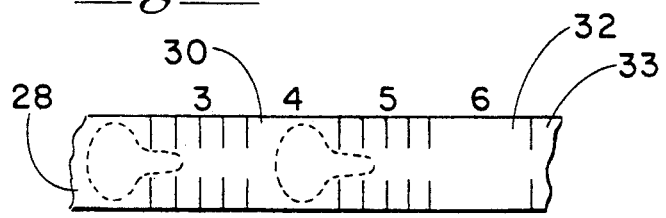

Stage 30 includes five heads or zones of the extruder. Along this stage, the moist starch mixture is heated to a temperature in the range of about 100 degrees C. to about 110 degrees C., to substantially gelatinize the starches. To this end, the second zone, third zone, fourth zone and fifth zone are maintained at respective barrel temperatures of 89 degrees C., 95 degrees C., 102 degrees C. and 103 degrees C. At the sixth zone of extruder 28 (i.e. the second stage), steam is vented from the starch mix, at this stage a dough mass, to rapidly cool the dough to a temperature below 100 degrees C. To enhance cooling and moisture release, the third and fifth zones of the extruder are provided with shear locks as indicated schematically in FIG. 2. The shear locks at zone three prevent backflow of steam and create a region of heavy mechanical work on the starch mixture at and immediately upstream of the third zone. The shear locks at zone 5 also prevents backflow of steam, but more importantly provides a restriction so that dough is conveyed into second stage 32 at a slower rate than the extruder is able to convey material downstream out of the second stage. This tends to maintain zone 32 relatively free of material, for more effective venting.

After venting, the dough proceeds through stage 34 of the extruder, where the dough is cooled and conveyed, subject to relatively low mechanical work. More particularly, the seventh, eighth and ninth zones are maintained at respective barrel temperatures of 73 degrees C., 83 degrees C. and 91 degrees C., thus keeping the dough below 100 degrees C. as it is conveyed through the third stage of the extruder. The rapid cooling and moisture release at stage 32, and the cooling along the final stage of the extruder, combine to prevent premature expansion of the dough as it exits die 36.

At die 36, the dough is formed into the desired shape and cut, e.g. using a rotary knife. The dough at this point has a moisture content in the range of about 21-25 percent, and is forced through the die under pressure of at least 200 psi. By the time it exits extruder 28, the dough has undergone sufficient mechanical work, heat and addition of moisture to achieve nearly 100 percent gelatinization of the starches. More particularly, a gelatinization of at least 98 percent is achieved, based on enzyme susceptibility, or on reduction of crystallinity as observed by microscopic inspection under polarized light.

A belt, a pneumatic conveyor or other conveying means is provided to transport the cut dough pieces from extruder 28 to a drying device 38, where the air is maintained at a temperature in the range of from about 43 degrees C. to about 65 degrees C., and more preferably in the range of 43-49 degrees C. The duration within the drying device is sufficient to reduce the moisture content of the dough pieces to about 9-14 percent by weight, and more preferably 10-12 percent by weight, while avoiding any case hardening. More particularly, a drying time from about three and one-half to about four hours has been found satisfactory when the air temperature in the dryer is maintained at 43.5 degrees C., with humidity levels being sufficient to insure the minimum duration of three and one-half hours for drying.

The process is further understood based on the following examples:

EXAMPLE I

A base or starch mixture was formed of a chlorinated soft wheat flour (cake flour) at 61 percent by weight, a pure food powder corn starch at 21 percent, modified corn starch (Mir-a-gel brand) at 9 percent by weight, and whole grain amaranth flour at 9 percent by weight. To this base, cheese flavoring was added at 4 percent, and a salt was added at 5 weight percent. Due to the presence of salt in the flavoring, the actual salt content was about 7 percent by weight. The starch mix and additives were thoroughly combined in a ribbon blender for a period of about five minutes. At this point, the mixture had a moisture content of about 11 percent by weight, and a density of about 32 pounds per cubic foot.

The starch mix including additives was then fed into a preconditioning device, in particular a paddle mixer operated at 190 rpm, although an operating range of 180 to 200 rpm was found satisfactory. Water was injected into the preconditioning device at rate of 6.4 kilograms per hour, and steam was injected at a rate of 0.254 kilograms per minute (about 15 kilograms per hour). The material throughput rate was about 110 kilograms per hour. Preconditioning formed a moist powder having a temperature of about 100 degrees C. and moisture at about 24 weight percent.

From a discharge chute of the preconditioner, the dough descended to the intake of extruder 28, particularly a twin screw extruder available from Wenger, Inc. of Sabetha, Kan. and identified as Model TX 52. The shafts of the extruder were operated at about 150 rpm, although it was found that a range of 140-165 rpm is satisfactory. Along the first stage of the extruder, water was added at the rate of 0.9 kilograms per hour. (In general, it has been found satisfactory to add water at the rate of 0-1.8 kilograms per hour). At the material throughput rate of about 110 kilograms per hour, the rotary knife was operated at a speed to cut individual pieces of the dough weighing about 1.6 grams each. The die was shaped to form six spoke wagon wheel pieces having a diameter of about one inch. A pressure head of about 450 pounds per square inch was developed at the ninth zone, just upstream of die 36. These conditions can vary, depending on the material throughput and the die shape. Of primary concern is providing sufficient heating, moisture addition and mechanical working of the dough, to achieve substantially total gelatinization of the starches.

The cut dough pieces were conveyed to dryer 38, where they were dried for three and one-half to four hours, with the air temperature in the dryer maintained at 43.5 degrees C. It should be noted that the conditions in dryer 36 can vary, keeping in mind the need to avoid case hardening, while completing the drying process in as short a time as reasonably practicable. Actual drying appears to proceed at approximately the same rate, throughout the 43-65 degrees C. temperature range.

The pieces of the starch were then expanded in a commercially available microwave oven at about 750 watts. Pieces of the dough were found to expand to volumes at least seven times the original, unexpanded volume, and in some cases as much as thirteen times the original volume. The expanded pieces had a uniform, rigid cellular structure, a fine texture and a crisp or crunchy mouth feel upon initial bite. The pieces also were tender and had a rapid mouth melt.

EXAMPLE II

The half product was prepared under conditions substantially identical to those in Example I, except that the moisture content of the mixture exiting the preconditioner was at 26 weight percent. With increased moisture content, it was found advantageous to operate the extruder at an increased speed of about 210–220 rpm. The resultant half product experienced expansion upon microwave heating, similar to that of the product of Example I.

EXAMPLE III

Process conditions were substantially identical to those in Example I, except that moisture of the starch mix and additives at the output of the preconditioner was 28 percent, and the extruder was operated at a speed of 240 rpm. The resulting volume expansion was somewhat less satisfactory than in Examples I and II, with expanded pieces having volumes of at least five times the original volumes.

EXAMPLE IV

Process conditions were substantially identical to those of Example I. However, 61 percent unchlorinated flour, in particular wheat flour known in the industry as pastry flour, was used in lieu of the chlorinated soft wheat flour of Example I. The resulting product expanded, but at a rate less than the expansion of products of Examples I and II.

EXAMPLE V

Process conditions were substantially identical to those in Example I, but 30 weight percent corn starch was used in lieu of the 21 percent corn starch plus 9 percent modified corn starch. The resultant product expanded at the satisfactory rates of Examples I and II, but did not exhibit the tenderness of the other products.

In general, it is believed essential to flavor the starch mix with dry flavoring additives, as opposed to essential oil flavors, to achieve the desired degree of expansion under microwave heating.

Thus in accordance with the present invention, a variety of starch sources including predominantly chlorinated soft wheat flour, with corn starch, modified corn starch and amaranth flour, enhanced with salt and flavorings if desired, are combined in a dry starch mixture. This mixture is preconditioned, substantially totally gelatinized and formed into pieces and dried, and exhibits a surprising degree of expansion in volume when subjected to microwave energy.

What is claimed is:

1. A process for preparing a shelf stable food half product expandable when exposed to microwave energy, including the steps of:

forming a dry starch mixture including at least 46 percent by weight a chlorinated soft wheat flour, from about 15 to about 25 percent by weight corn starch, from about 6 to about 15 percent modified corn starch, and from about 5 percent to about 10 percent salt;

heating the starch mixture to a temperature of about 100 degrees C. while adding moisture to the starch mixture until the starch mixture includes moisture at from about 22 percent to about 27 percent by weight;

kneading the starch mixture while adding heat to maintain the temperature of the starch mixture in the range of from about 100 degrees C. to about 110 degrees C. to form a dough;

after said kneading step, rapidly cooling the dough to a temperature substantially below 100 degrees C.;

after said cooling step, lightly working the dough while maintaining the dough to a temperature below about 100 degrees C.;

forming the dough into a predetermined shape and cutting the dough into pieces having the predetermined shape, as the dough exits the extrusion means; and drying the dough pieces to reduce their moisture content to within the range of about 9 percent to about 14 percent by weight, at a rate sufficiently gradual to substantially avoid case hardening.

2. The process of claim 1 wherein:

the dry starch mixture further includes whole grain amaranth flour within the range of from about 5 percent to about 15 percent by weight.

3. The process of claim 2 wherein:

the step of forming a dry starch mixture further includes adding dry flavoring additives to the mixture in the range of from about 1 percent to about 10 percent by weight.

4. The process of claim 1 wherein:

the step of forming the dry starch mixture includes mixing constituents of the mixture in a ribbon blending device.

5. The process of claim 1 wherein:

the step of heating the starch mixture and adding moisture includes feeding the starch mixture through a preconditioning device for performing mechanical work upon the mixture while water and steam are added to the mixture, each at a controlled and steady rate.

6. The process of claim 5 wherein:

the step of heating the starch mixture includes adding moisture to increase the moisture content of the starch mixture to within the range of from 22 to 24 percent moisture by weight.

7. The process of claim 1 wherein:

the step of kneading the starch mixture includes feeding the dough through a first stage of a twin screw extruder having a plurality of zones along the first stage, and heating the zones along the first stage, at temperatures progressing from about 89 degrees C. at a first upstream zone, to a temperature of about 103 degrees C. at a final downstream zone of the first stage.

8. The process of claim 7 wherein:

the step of rapidly cooling the dough includes venting steam from the dough at an intermediate zone of the extruder immediately downstream of said final zone of the first stage.

9. The process of claim 7 wherein:

the step of working the dough includes the step of conveying the dough along a plurality of zones forming a third stage of the twin screw extruder, while cooling to maintain a first, upstream zone of the third stage at a temperature of about 73 degrees C., and a final, downstream zone of the third stage to a temperature of about 91 degrees C.

10. The process of claim 9 wherein:

the step of forming pieces of the dough includes feeding the dough out of the extruder through a die at a pressure of at least 200 pounds per square inch.

11. The process of claim 1 wherein:
the step of drying the pieces includes maintaining the pieces within an enclosure at a drying air temperature in the range of from about 43 degrees C. to about 65 degrees C.

12. The process of claim 11 wherein:
the drying air in the enclosure is maintained at a substantially constant temperature within the range of from about 43 degrees C. to about 49 degrees C.

13. The process of claim 12 wherein:
the dough pieces are maintained with the drying air at a temperature of about 43.5 degrees C., for about three and one-half hours.

14. A shelf stable food half product expandable in microwave ovens, including:
a substantially rigid, uniform matrix of gelatinized starch formed from a dry starch mixture including at least 46 percent by weight chlorinated soft wheat flour from about 15 percent to about 25 percent by weight corn starch, from about 6 percent to about 15 percent modified corn starch, and further including moisture at from about 9 percent to about 14 percent by weight, said matrix being expandable in a microwave oven to an expanded volume at least five times its unexpanded volume.

15. The food half product of claim 14 wherein: the starch mixture further includes whole grain amaranth flour in the range of from 5 percent to 15 percent of the mixture, by weight.

16. The food half product of claim 15 wherein:
the starch mixture includes the soft wheat flour in the range of 51 percent to 71 percent, corn starch in the range of 18 to 22 percent, modified corn starch in the range of 8-10 percent, amaranth flour in the range of 8-10 percent, and salt in the range of 3.2-5 percent, all by weight.

17. The food half product of claim 16 wherein:
the starch mixture includes the soft wheat flour at 61 percent by weight, the corn starch at 21 percent, the modified corn starch at 9 percent and the amaranth flour at 9 percent, all by weight.

18. The food half product of claim 14 wherein:
the moisture content is in the range of from 8 percent to 10 percent, by weight, and is substantially uniform throughout the matrix.

19. A shelf stable food half product expandable in microwave ovens, consisting essentially of:
a substantially rigid, uniform matrix of gelatinized starch formed from a dry starch mixture, said dry starch mixture including:
(a) at least 46 percent by weight chlorinated soft wheat flour;
(b) from about 21 percent to about 40 percent by weight a corn product consisting of at least one of the following constituents: corn starch and modified corn starch;
(c) moisture at from about 9 percent to about 14 percent by weight;
said matrix being expandable in a microwave oven to an expanded volume at least five times its unexpanded volume.

20. The food half product of claim 19 wherein:
the dry starch mixture further includes whole grain amaranth flour in the range of from 5 percent to 15 percent of the mixture, by weight.

21. The food half product of claim 20 wherein:
the starch mixture includes a soft wheat flour in the range of 51 percent to 71 percent, amaranth flour in the range of 8-10 percent, and salt in the range of from 3.2 to 5 percent, and wherein the corn product includes corn starch in the range of 18 to 22 weight percent of the starch mixture and modified corn starch in the range of 8 to 10 percent of the starch mixture.

22. The food half product of claim 21 wherein:
the starch mixture includes the chlorinated soft wheat flour at 61 percent by weight, the corn starch at 21 percent, the modified corn starch at 9 percent and the amaranth flour at 9 percent, all by weight.

23. The food half product of claim 19 wherein:
the moisture content is in the range of from 8 percent to 10 percent by weight, and is substantially uniform throughout the matrix.

* * * * *